United States Patent [19]

Blankenburg

[11] 4,177,915
[45] Dec. 11, 1979

[54] METHOD FOR MANUFACTURING LARGE TANKS

[75] Inventor: Carl H. T. Blankenburg, Trosa, Sweden

[73] Assignee: Wikstrom International AB, Stockholm, Sweden

[21] Appl. No.: 916,495

[22] Filed: Jun. 19, 1978

[51] Int. Cl.² ............................................. B23K 31/02
[52] U.S. Cl. ...................................... 228/184; 228/29
[58] Field of Search ...................... 228/184, 25, 29, 30; 29/429

[56] References Cited

U.S. PATENT DOCUMENTS

| 2,919,896 | 1/1960 | Wurst | 29/429 |
| 3,131,908 | 5/1964 | Payton | 29/429 |
| 3,199,839 | 8/1965 | Linder et al. | 29/429 |
| 3,604,612 | 9/1971 | Miller et al. | 228/29 |
| 3,817,440 | 6/1974 | Bartley | 228/29 |

Primary Examiner—Lowell A. Larson
Attorney, Agent, or Firm—Flynn & Frishauf

[57] ABSTRACT

A method for manufacturing large tanks according to the "from the top and down" method, comprising manufacturing the roof of the tank first at ground level and then successively attaching generally cylindrical plates one below the other as the completed part of the tank is raised in stages. The plates each have lifting lugs which alternately cooperate with lifting units for successively raising the partially completed tank and with a guide rail which is used for guiding of a welding machine. The guide rail is preferably adjustably suspended relative to each lug so that the distance from the guide rail to the lower edge of the plate sweep, i.e. where the welding seam is to be made, can be precisely adjusted.

11 Claims, 11 Drawing Figures

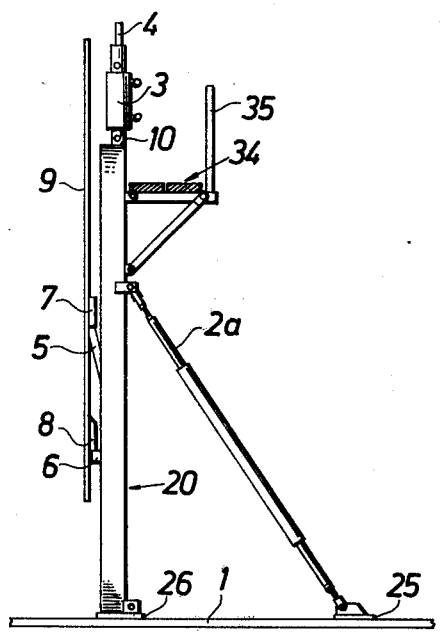
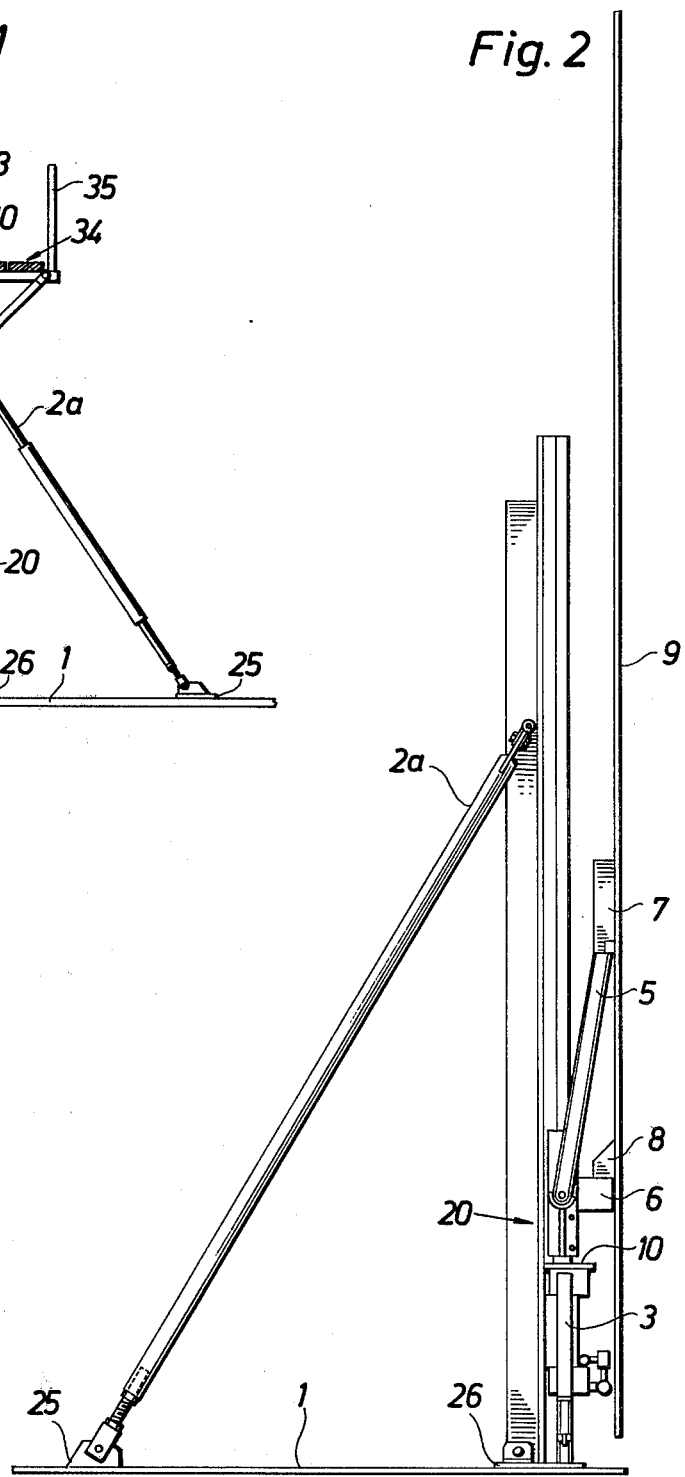

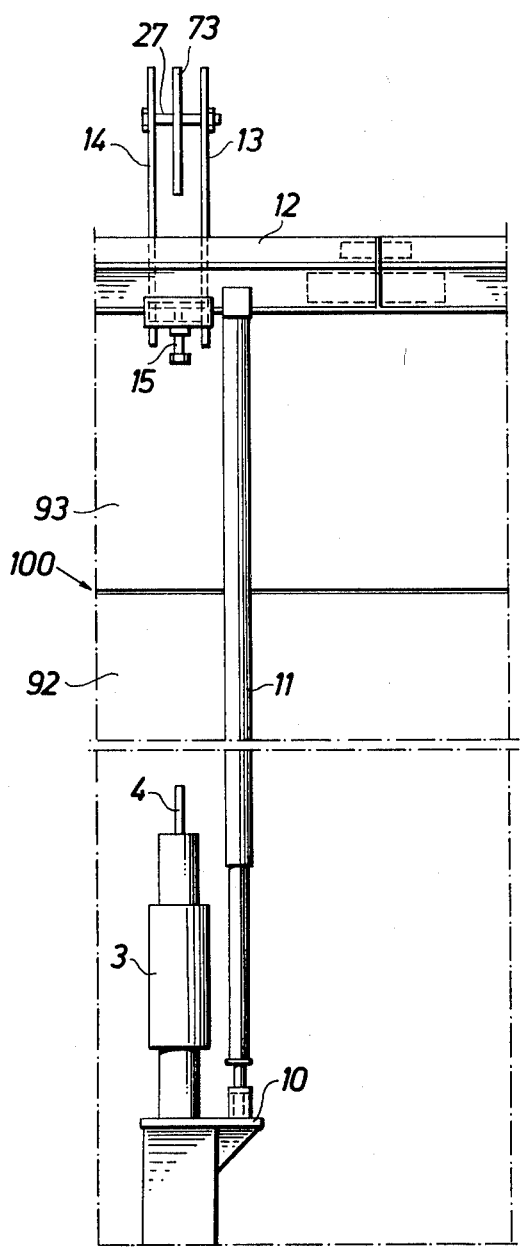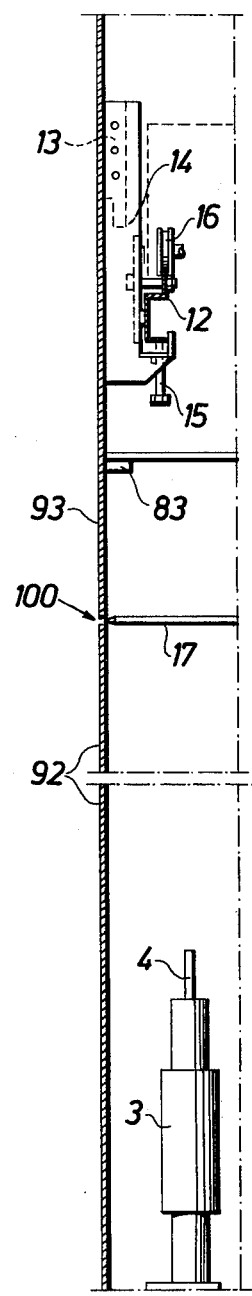

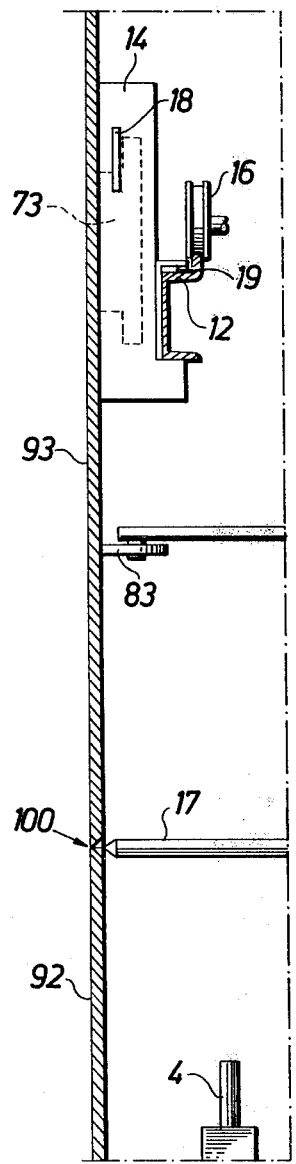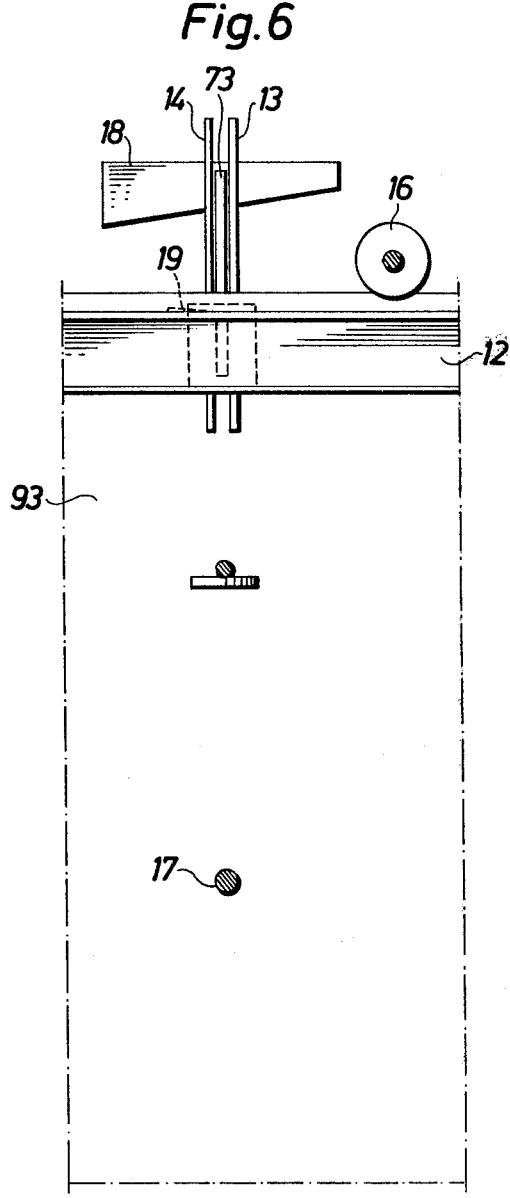

U.S. Patent  Dec. 11, 1979  Sheet 4 of 4  4,177,915
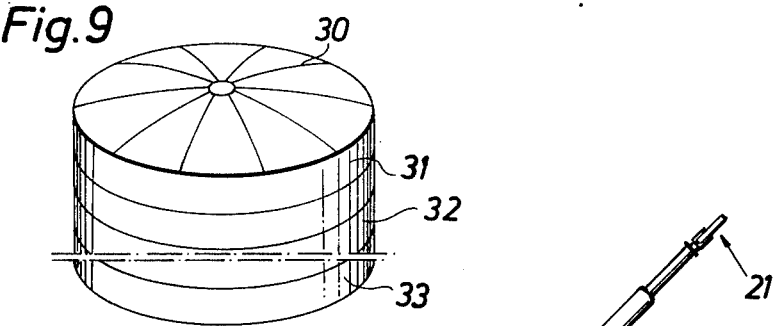
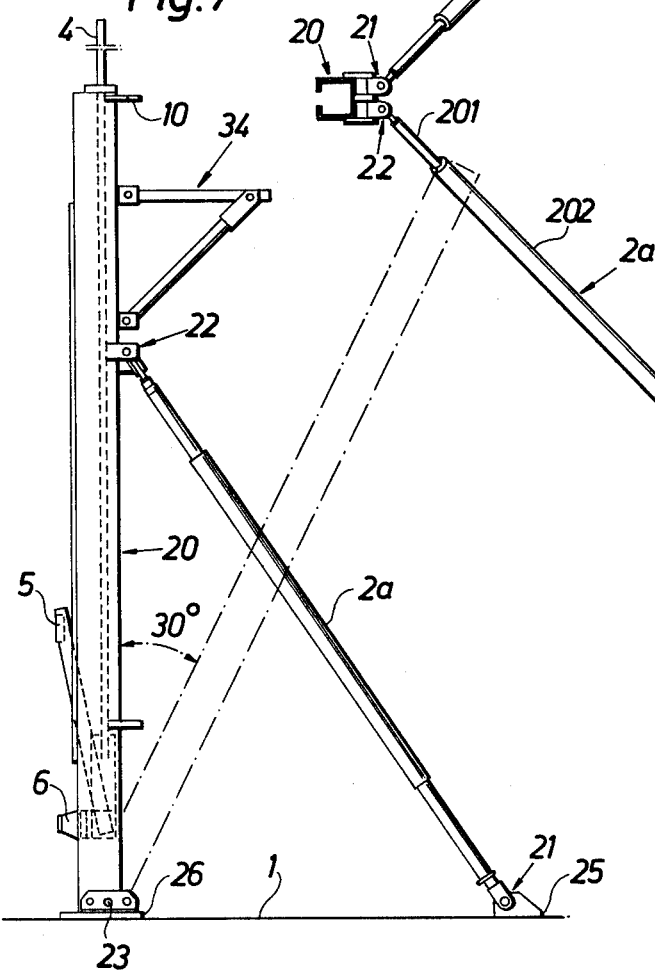
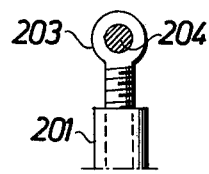
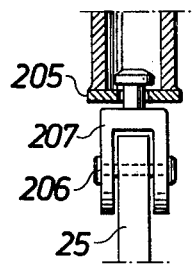

METHOD FOR MANUFACTURING LARGE TANKS

BACKGROUND OF THE INVENTION

This invention relates to a method for manufacture of large tanks according to the "from the top and down" principle, whereby the roof of the tank is manufactured first at ground level, and successive generally cylindrical plates are attached one below the other as the completed part of the tank is raised in stages, the tank thereby growing from below.

At present there are in principle two usable methods for rational manufacture of large tanks on site. According to one of these methods, called "from the bottom and up", the bottom plate is laid out and welded, the lowermost plate sweep (i.e., generally cylindrical plate section) of the tank is mounted to the bottom plate and welding is carried out in the vertical seams and to the bottom plate. The next plate sweep is placed on the one beneath it and welded to this, whereupon the vertical seams are welded. The supporting structure of the roof consists as a rule of a center ring and radial, somewhat curved steel girders which are suspended on the tank wall and in the center ring. The center ring is placed at the right height on a temporary scaffolding and the steel girders are placed in the right position and welded to the center ring and to the wall. When this task has been completed the tank structure is self-supporting and the temporary scaffolding for the center ring can be dismantled, whereupon the roof covering of plate is mounted and welded.

According to the other prior art method, called "from the top and down", the bottom plate is laid out and welded. The plate sweep lying uppermost in the finishing tank is mounted and the vertical seams are welded. The roof of the tank is manufactured in principle in the same manner as in the previously described method but largely at ground level and in some cases small openings must be left in the roof for the hoisting equipment used to raise same. The hoisting devices are then mounted and connected via lugs to the topmost plate sweep, whereupon the finished tank section is lifted by the hoisting devices disposed around the plate sweep a height corresponding to the height of the next plate sweep. The next topmost plate sweep in the finished tank is then mounted below the raised completed section and vertically and horizontally welded to the lowermost plate sweep of the raised completed section. The lifting devices are then connected to the plate sweep which has just been assembled and the above procedure is repeated until the tank has attained its full height. The bottommost plate sweep is then welded to the bottom plate.

In welding work according to the first of the prior methods mentioned above, a working platform has to be installed on a working level with each plate sweep, which is a time-consuming and risky operation. When the other prior method is used, the welding work is done at ground level and usually without a working platform. Automatic welding machines have been used for some 20 years in connection with the first abovementioned prior method and in this context use is made of a welding machine which is hung up on wheels on the upper edge of the topmost plate sweep, the wheels being driven synchronously with the desired welding speed. For the vertical seams a welding machine is used which is either suspended on the topmost plate sweep or mounted on a vertical pillar which is successively lengthened as the tank-building work proceeds. Important in all welding work is that the automatic welding machines have to be guided or steered exactly parallel to the welding seam and driven synchronously with the welding speed. In tank building according to the prior "from the top and down" method, two methods of automatically welding horizontal seams have been tested and pillar welding machines are relatively often used for the vertical seams. According to one of these prior horizontal welding methods the welding machine was suspended by wires which were attached to a trolley which ran on a track on the inside of the tank roof. As the tank was successively raised in stages the wires had to be lengthened and consequently difficulties were experienced in getting the trolley and the welding machine to run synchronously relative to each other. An attempt was then made to solve this problem by replacing the wires by a pipe scaffolding but the same problem arose as soon as the distance between the welding machine and the suspension track became large. For this reason this prior method did not attain any great sucess.

According to the second prior horizontal welding method the welding machine was hung up in a scaffolding with a drive device running on a track which was mounted on the bottom plate of the track and with idler wheels against the tank wall. Since tank bottoms are often not flat and to some extent may also be dished or wave-shaped and since the tank wall is seldom perfectly circular, difficulties were experienced in keeping the electrode of the welding machine in the correct position relative to the seam.

From the above it follows that there is currently no practical method by which to automatically weld the seams in the tank walls when the tank is built by the "from the top and down" method and a primary objective of the present invention is to provide a suitable method for this.

The hoisting devices used when building tanks from the top and down usually comprise hydraulic lifters which cooperate with a hoisting pillar so that the lifters pull or press an arm which is obliquely directed upwards against the tank wall. The connection between the smooth tank wall and the tops of the inclined arms is achieved in that lugs are welded to the tank wall, the tops of the inclined arms working against the lower part of the said lugs. These lugs are welded to the plate sweep at which lifting is to occur and exactly equidistant from the lower edge of the plate sweep.

SUMMARY OF THE INVENTION

The method of manufacturing large tanks according to the "from the top and down" principle comprises manufacturing the roof of the tank first at ground level, and then attaching successive plate sweeps, each having lugs mounted thereon, one below the other, the completed part of the tank being raised in stages and a new plate sweep being fixed under the plate sweep immediately above it so that the tank grows from below. In accordance with the present invention the improvement comprises mounting a plurality of lifting units around a plate sweep: engaging the lifting units with lugs of the plate sweep to raise the finished part of the tank: placing another plate sweep under the raised part of the tank: mounting a welding machine guide rail to the lugs of one of said raised plate sweeps: and then welding a seam between two of the plate sweeps with a welding machine guided on said guide rail.

Preferably, the lifting units and guide rail are mounted interiorly of the tank and the lugs extend toward the interior of the tank.

BRIEF DESCRIPTION OF THE DRAWINGS

FIG. 1 shows an example of a lifting unit which can be modified for use in carrying out the method of the present invention:

FIG. 2 is similar to FIG. 1 but with a different placing of the lifters of the lifting unit:

FIG. 3 shows a view of the upper part of a lifting unit modified according to the present invention:

FIG. 4 shows the upper part of the modified lifting unit with appurtenant parts but viewed from the side:

FIG. 5 shows a different embodiment than in FIGS. 3 and 4 of the attachment of the guide rail to the lugs:

FIG. 6 shows the same thing as FIG. 5 but viewed from the side:

FIGS. 7 and 8 show a lifting unit with braces, which lifting unit can be used when carrying out the method of the present invention:

FIG. 9 generally illustrates the type of tank which may be made according to the present invention: and FIGS. 10 and 11 illustrate the ends of the braces 2a, 2b of FIGS. 7 and 8 in greater detail.

DETAILED DESCRIPTION

Referring to FIG. 9, in the manufacturing method of the present invention the roof structure 30 and topmost plate sweep 31 of a large tank (for example 10 to 80 meters in diameter) are manufactured first at ground level, and lower plates 32, 33, etc. are added to the bottom as the completed upper section is successively raised.

As seen in FIGS. 1 and 2, each plate sweep 9 is provided with at least two lugs 7, 8, one above the other. Pairs of lugs 7, 8 are spaced about the periphery (preferably the inner periphery of the plate sweep). A plurality of lifting units, for instance largely according to those shown in FIG. 1 or FIG. 2, are then placed around the entire plate sweep on the inside of the tank-to-be on a bottom plate 1 and then tack-welded to bottom plate 1 at 25 and 26 so as to be definitely fixed in position. Each lifting unit is then aligned with lugs 7 and 8 on a plate 9 and so that it stands vertically with the aid of pivotally connected and adjustable braces 2a, 2b (see FIG. 8). Placed for example on the top of the lifting unit (FIG. 1) or below its lifting arm (FIG. 2) is a hydraulic lifter 3, which actuates a pullrod or pushrod 4 which in turn runs down in the slotted lifting pillar 20 to two arms 5, 6. One arm 5 rests against an upper lug 7 to lift a plate 9 in one sweep and the other arm 6 rests against a lower lug 8 to keep the plate sweep 9 at a fixed distance from the lifting pillar 20.

The lifting unit shown in FIG. 1 has, as better seen in FIGS. 3 and 4, a carrying member 10 provided at its upper end upon which an adjustable length strut 11 rests. Strut 11 is not shown in FIGS. 1 and 2. The upper part of strut 11 supports in some cases—as explained in more detail below—a guide rail 12 appropriately devised as a U-section or box-section on edge (See FIG. 4), which guide rail 12 is supported in some cases by a plate sweep lug 73 via for example two suspenders 13, 14 having a cross member 27 extending therebetween and an adjustable screw 15. Only one lug 73 is shown in FIGS. 3 and 4 but naturally each plate in this sweep around the tank is supplied with at least one such lug 73 which co-act in an equivalent manner with its appurtenant lifting unit. Preferably a plurality of such lugs 73 are mounted around the plate sweep. Similarly the guide rail 12 runs appropriately around the entire plate sweep and on guide rail 12 runs a welding machine, which has merely been indicated in FIG. 4 by means of a wheel 16 and a welding nozzle 17.

In the embodiment illustrated in FIGS. 3 and 4 the guide rail 12 is located on the upper lugs in the third plate sweep counted upwards from ground level and for this reason the lug in the drawing has been designated by reference numeral 73 instead of by reference numeral 7 as in FIG. 1, and for the same reason its corresponding plate has been given the reference numeral 93 since it belongs to the third plate sweep from below around the tank. The horizontal welding is thus carried out in this case at position 100 between the third plate sweep 93 counted from ground level and the second plate sweep 92 counted from the same level. By this means it is ensured—in the event that rigid pullrods 4 which protrude above the lifting units are used—that the lifting units will not need to be moved or collapsed to carry out welding. The welding instead is carried out at a level which lies above the level to which the pullrods 4 normally reach. In execution of the horizontal welding procedure, the struts 11 are removed after the guide rail 12 is suspended so as not to interfere with the welding machine. Since the lifting units have not been moved, they are ready for the next lifting step with a minimum of wasted time.

Shown in FIGS. 5 and 6 is largely the same thing as in FIGS. 3 and 4, but according to FIGS. 5 and 6 use is made of wedges 18 and 19 to impart to guide rail 12 the correct position in relation to the lower edge of the plate sweep, i.e., the lower edge of plate sweep 93 where the welding seam is to be made. Wedge 18 in FIGS. 5 and 6 replaces cross member 27 shown in FIG. 3. By moving wedge 18 to the left or right as seen in FIG. 6, the height of the rail 12 relative to the support lug 73 is adjusted.

Shown in FIGS. 7 and 8 is a lifting unit which is specifically adapted to permit welding of horizontal seams to be performed between the first plate sweep counted from ground level and the second plate sweep counted from the same ground level. In this embodiment, each lifting unit can be tilted inwards—to the right according to FIG. 7—about its pivotal mounting 23. The lifting pillar 20 can be tilted about its pivotally mounted foot a sufficient distance so that an automatic welding machine running along the guide rail 12 (as described above) is able to pass between the plate (not shown in FIG. 7) and the tilted lifting unit. The lifting unit is so tilted after the guide rail 12 is suspended from lugs, for example lugs 73 in FIGS. 3-6, so that it is obviously completely unladen during tilting.

The braces 2a and 2b are—as is evident from FIGS. 8, 10 and 11—adjustable and are also pivotally attached to the bottom plate 1 at 21 and to the lifting unit at 22.

A description now follows of two examples of how tank-building can be carried out according to the method of the present invention. The topmost plate sweep (plate sweep number one) and the roof are first assembled in a per se prior art manner. Lugs 7 and 8 have been provided in a quantity corresponding to the number of lifting units which it is wanted to utilize on the plates, the lifting units with appurtenant pressure sources have been installed and lifting of one plate height has been carried out by means of arms 5, 6 cooperating with lugs 7, 8 and by hydraulic devices 3. The next plate sweep (plate sweep number two) is mounted under the raised section and fixed by its upper and lower edge and at the vertical seams. Locking of all seams is carried out in a per se prior art manner before welding with wedges and wedge plates and the outer sealing weld can be performed manually. Alternative, the vertical seams can at this point be machine-welded from the inside with a pillar welding machine. Lifting of one plate height is again carried out with the aid of the lifting units cooperating with lugs 7, 8 on plate sweep number two, and plate sweep number three is mounted in the same manner as described above in connection with plate sweep number two. Lifting a distance corresponding to a plate height is again carried out. On what at this juncture is the topmost plate sweep and more specifically on its upper lugs, one of which is indicated by reference numeral 73 in FIG. 3 are mounted suspenders 13 and 14 and guide rail 12, which comprises the track for the idler wheel 16 of the welding machine. The horizontal seam is now welded by a welding machine running on guide rail 12. If only one outer sealing weld has been attained in the vertical seams, a vertical welding machine can be hung up on guide rail 12 and complementary vertical welding on the inside of the plate sweep can thus be performed.

In practical application, however, it is, if possible, particularly convenient if the lowermost lug 8 of each plate sweep is used to support the guide rail 12.

Before a new lifting is carried out, the lower lugs 83 (corresponding to lug 8 in FIGS. 1 and 2) are cut off and the guide rail 12 is supported by means of the struts 11, positioned for example between the carrying members 10 and the guide rail 12 or between the bottom plate 1 and the guide rail 12. The connection between lug 73 and guide rail 12 is released, whereupon the finished part of the tank is lifted one plate height. Guide rail 12 thus remains at the same height (supported by struts 11) while the wall of the tank is being lifted upwards so that upon completion of the lifting, lug 72 on plate sweep number two has reached the suspenders 13, 14 of the guide rail 12. Lugs 72 on plate sweep number two and guide rail 12 are connected together and the welding operation to achieve a horizontal welding seam between plate sweeps number two and three can be carried out.

When the tank has reached its intended height and the welding procedure as described above has been terminated, all that remains is welding of the seam between the next bottommost and the bottommost plate sweep. To achieve this, the lifting equipment is removed, whereupon the guide rail 12, for instance with the aid of some small wire winches, is lowered to the lower lug on the next bottommost plate sweep. During this lowering, of course, the guide rail 12 is not supported by struts 11. After this lowering of the guide rail 12, the next bottommost seam is welded and the welding machine and guide rail are then removed. Finally, the seam between bottom plate 1 and the lowermost plate sweep is welded.

In an alternative method according to the present invention, the horizontal welding is performed between the last raised plate sweep and the lowermost, newly inserted plate sweep. The guide rail 12 for the welding machine is hung up in lugs on the last raised plate sweep in the same manner as indicated above and is made so slender that room for it is available between the lifting units and the tank wall. During the horizontal welding the lifting units are unladen (since the guide rail is hung from lugs) and are folded or tilted inwards toward the center of the tank about the pivot bolts in the footplate. The lifting units are tilted far enough to allow the welding machine which is guided on guide rail 12 to run freely between the lifting units and the wall of the tank. See the above description of FIGS. 7 and 8. Tilting of the lifting units can be carried out by shortening the adjustable length braces 2a, 2b somewhat and by then tilting the lifting units about their pivotal mountings.

Rearward folding or tilting of the lifting units is obviously also accomplishable through different embodiments of the lifting units. For example, the braces 2a, 2b according to FIG. 8 are telescopic and threaded and may have pegs. See FIGS. 10 and 11, of which FIG. 10 shows in closer detail the upper part of brace 2a and of which FIG. 11 shows in closer detail the lower part of brace 2a. The braces 2a and 2b are identically designed and, consequently, only brace 2a will be explained further. Each brace comprises a tube 201 having internal threads, which tube in its turn is provided with an outer tube 202, which is acting as a reinforcement against folding of tube 201. In the upper part, the threads of tube 201 are in engagement with a threaded eye-bolt 203—as shown in FIG. 10—which eye-bolt 203 in its turn via a peg 204 is connected to the lifting pillar 20. The other end of tube 201 has a washer 205 welded thereto with a centrally located drillhole. In said hole, one end of a fork-shaped attachment means 207 is running and said attachment means 207 is connected to the bottom plate 1 via a peg 206 and a small plate 25, welded to the bottom plate 1. Consequently, by turning the tube 201 in either direction the distance between pillar 20 and the small plate 25 will be reduced or enlarged and, thus, the pillar 20 will be raised or lowered correspondingly.

When the lifting units are to be folded or tilted, the pegs 206 etc. are removed and the lifting units are folded inwardly to a fixed position as is indicated with broken lines in FIG. 7. When the lifting units are to be raised or uprighted again after welding, they are folded up against the tank wall and the pegs 206 etc. are reinserted. Adjustment of the length of the braces 2a, 2b is performed by turning tube 201 so that the lifting unit stands vertically.

In the above-described alternative method wherein the lifting units are tilted prior to welding, the guide rail 12 must be relieved against bottom plate 1 instead of against the carrying member 10 while the tank wall is being lifted. To accomplish this, support struts similar to struts 11 may be provided between the tank floor 1 and the guide rail 12 to support guide rail 12.

Preferably, all of the braces 2a, 2b are adjustable in length so that the positions of the lifting units relative to the plate sweeps may be adjusted.

As seen in FIG. 1, a platform or stage 34 with a safety rail 35 is provided on the lifting units, on which a worker may be supported. A similar platform or stage 34 is shown in FIG. 7.

As used herein, the term "plate sweep" refers to a circular ring-shaped plate 31, 32, 33, etc. of the resulting tank, as shown in FIG. 9. The plate sweeps 31, 32 or 33, due to their large size, are each preferably fabricated from a plurality of plate sections located side by side and welded together so as to form the overall ring-shaped structure. Each of the plates of the plate sweep preferably have at least one pair of lugs 7, 8 thereon for engagement with the respective lifting units. As should be clear, a plurality of lifting units and associated lugs 7, 8 are provided around the inner periphery of the tank, the exact number of lifting units and associated lugs varying depending upon the size of the tank structure, the lifting capacity of the lifting units, etc.

In the present invention, it is assumed that the guide rail 12 is cooperating with any of the lugs which are used when lifting the tank-to-be but it is, of course, also possible to use other lugs attached and preferably welded to each plate to act as support for the guide rail 12, if deemed suitable.

I claim:

1. In a method of manufacturing large tanks according to the "from the top and down" principle, whereby the roof of the tank is manufactured first at ground level, and successive plate sweeps, each having lugs mounted thereon, are attached one below the other, the completed part of the tank being raised in stages and a new plate sweep being fixed under the plate sweep immediately above it so that the tank grows from below, the improvement comprising:

mounting a plurality of lifting units around a plate sweep:

engaging said lifting units with lugs of said plate sweep to raise the finished part of the tank:

placing another plate sweep under the raised part of the tank:

mounting a welding machine guide rail to said lugs of one of said raised plate sweeps: and welding a seam between two of said plate sweeps with a welding machine guided on said guide rail.

2. The method of claim 1 comprising disengaging said lifting units from said lugs prior to mounting said guide rail to said lugs of one of said raised plate sweeps.

3. The method of claim 1 or claim 2 wherein said lifting units are mounted interior of the tank and said lugs extend toward the interior of said tank.

4. The method of claim 1 or claim 2 comprising maintaining said guide rail disconnected from said lugs and maintaining said guide rail at substantially the same level while said lifting units raise said finished part of the tank.

5. The method of claim 1 or claim 2 comprising supporting said guide rail during said raising of said finished part of the tank by struts connected to at least one of the stationary parts of said lifting units and a bottom plate of the tank.

6. The method of claim 1 or claim 2 comprising mounting said guide rail to the lugs of the third plate sweep counted from the bottom and upwards.

7. The method of claim 1 or claim 2 comprising mounting said guide rail to the lugs of the second plate sweep counted from the bottom and upwards and moving said lifting units out of their lifting position sufficiently to provide a space between the first plate sweep and the lifting units such that said welding machine is able to pass between said first plate sweep and said moved lifting units.

8. The method of claim 7 wherein said lifting units are mounted interior of the tank and are moved by tilting same inwardly of the tank and away from said first plate sweep.

9. The method of claim 1 or 2 wherein said plate sweeps comprise a plurality of plates, and each plate in a plate sweep provided with two lugs one placed above the other, and comprising mounting said guide rail to the lower lug in each plate on the plate sweep.

10. The method of claim 1 or claim 2 wherein said plate sweeps comprise a plurality of plates, and each plate in a plate sweep provided with two lugs one placed above the other, and comprising mounting said guide rail to the upper lug on each plate in the plate sweep.

11. The method of claim 1 wherein the position of said guide rail relative to each lug to which it is mounted is adjustable, and comprising adjusting said position of said guide rail such that the distance of said guide rail to the lower edge of the plate sweep to which it is mounted will remain the same regardless of the distance from the respective lugs to the said lower edge.

* * * * *